US009631852B2

(12) United States Patent
Kopko (10) Patent No.: US 9,631,852 B2
(45) Date of Patent: Apr. 25, 2017

(54) SYSTEM AND METHOD FOR CONTROLLING COMPRESSOR MOTOR VOLTAGE (71) Applicant: JOHNSON CONTROLS TECHNOLOGY COMPANY, Holland, MI (US)

(72) Inventor: William L. Kopko, Jacobus, PA (US)

(73) Assignee: Johnson Controls Technology Company, Holland, MI (US)

(*) Notice: Subject to any disclaimer, the term of this patent is extended or adjusted under 35 U.S.C. 154(b) by 307 days.

(21) Appl. No.: 14/204,593

(22) Filed: Mar. 11, 2014

(65) Prior Publication Data
US 2014/0271232 A1 Sep. 18, 2014

Related U.S. Application Data (60) Provisional application No. 61/787,758, filed on Mar. 15, 2013.

(51) Int. Cl.
F25B 49/02 (2006.01)
F04D 27/02 (2006.01)

(52) U.S. Cl.
CPC ........ F25B 49/025 (2013.01); F04D 27/0261 (2013.01); F25B 2600/021 (2013.01); F25B 2600/024 (2013.01); F25B 2600/0253 (2013.01); F25B 2700/151 (2013.01); Y02B 30/741 (2013.01)

(58) Field of Classification Search
CPC .............. F25B 49/025; F25B 2600/021; F25B 2600/024; F25B 2600/025; F25B 2600/0253; F25B 2700/151; Y02B 30/741
USPC ..................... 62/228.1, 228.4, 230
See application file for complete search history.

(56) References Cited

U.S. PATENT DOCUMENTS

| 5,506,486 A * | 4/1996 | Hayashi .............. F04C 18/0215 318/808 |
| 6,825,575 B1 * | 11/2004 | Edelson .................. B60L 11/04 290/40 B |
| 8,375,735 B2 | 2/2013 | Lifson et al. |
| 9,080,797 B2 * | 7/2015 | Sishtla .................. F04D 25/022 |
| 2002/0170307 A1 * | 11/2002 | Nishizuka ................. F24F 1/40 62/230 |
| 2008/0072619 A1 * | 3/2008 | Nojima ................. F25B 49/025 62/498 |
| 2008/0131287 A1 * | 6/2008 | Wilson .................. F25B 49/025 417/18 |

* cited by examiner

Primary Examiner — Jonathan Bradford
(74) Attorney, Agent, or Firm — Fletcher Yoder, P.C.

(57) ABSTRACT

A variable speed drive (VSD) can be used to vary the voltage-to-frequency ratio (V/f) supplied to a compressor motor of a heating, ventilation, air conditioning or refrigeration (HVAC&R) system to compensate for varying conditions in the HVAC&R system.

6 Claims, 10 Drawing Sheets

SYSTEM AND METHOD FOR CONTROLLING COMPRESSOR MOTOR VOLTAGE

CROSS-REFERENCE TO RELATED APPLICATION

This application claims the benefit of U.S. Provisional Application No. 61/787,758, filed Mar. 15, 2013, entitled SYSTEM AND METHOD FOR CONTROLLING COMPRESSOR MOTOR VOLTAGE, which Application is incorporated by reference herein in its entirety.

BACKGROUND

The application generally relates to controlling the voltage of a compressor motor. The application relates more specifically to controlling the voltage of a compressor motor using only the inputs available on a variable speed drive logic board and motor design information.

In a chiller system or other heating, ventilation, air conditioning or refrigeration (HVAC&R) system where the compressor is coupled with a variable frequency drive (VFD) or variable speed drive (VSD), the compressor motor is typically sized to operate at a particular voltage-to-frequency (V/f) ratio and a particular load point. Because the compressor in the actual system can operate during a variety of conditions, the motor is typically not operating at peak efficiency.

Therefore, what is needed is a control system for a variable speed drive or variable frequency drive that can vary the ratio of voltage to frequency provided to a compressor motor to optimize motor efficiency.

SUMMARY

The present invention is directed to a method for controlling compressor motor voltage. The method includes calculating a motor current based on an operating frequency of a compressor motor operating at a predetermined volts/frequency ratio and calculating a first current/volts ratio based on the calculated motor current, the operating frequency and the predetermined volts/frequency ratio. The method also includes calculating a second current/volts ratio based on a measured motor current, the operating frequency and the predetermined volts/frequency ratio and comparing the calculated first current/volts ratio to the calculated second current/volts ratio. The method further includes adjusting a voltage provided to the compressor motor by a variable speed drive in response to the calculated first current/volts ratio being unequal to the calculated second current/volts ratio.

The present invention is further directed to a system having a compressor, a condenser, an expansion device and an evaporator connected in a closed refrigerant circuit. The system also has a motor connected to the compressor to power the compressor and a variable speed drive connected to the motor to power the motor. The variable speed drive is operable to provide a variable voltage to the motor and a variable frequency to the motor. The system further has a control panel to control operation of the variable speed drive and one or more components of the system and a sensor to measure a current for the motor. The sensor communicates the measured motor current to the control panel. The control panel executes a control algorithm with the measured motor current as an input to adjust a voltage provided to the motor by the variable speed drive in order to operate the motor at a current/volts ratio stored in a memory device.

One embodiment of the present application is for a method for controlling compressor motor voltage. The method includes calculating an optimum motor current based on an operating frequency of a compressor motor operating at a predetermined volts/hertz ratio and calculating an optimum current/volts ratio based on the calculated optimum motor current, the operating frequency and the predetermined volts/hertz ratio. The method also includes calculating an operating current/volts ratio based on a measured motor current, the operating frequency and the predetermined volts/hertz ratio, comparing the calculated optimum current/volts ratio to the calculated operating current/volts ratio and adjusting a voltage provided to the compressor motor by a variable speed drive in response to the calculated optimum current/volts ratio being unequal to the calculated operating current/volts ratio.

In the present application, the VFD or VSD can vary the V/f supplied to the motor to make the motor "stronger" or "weaker" to compensate for the varying conditions in an HVAC&R system.

One or more advantages of the present application can include: the incorporation of a simple control algorithm; the use of existing inputs to a VSD logic board; the requirement for a minimum of motor design information; the providing of stability and reliability to motor operation; the providing of an expanded operating range for the motor; the providing of a lower motor temperature during operation; the providing of a lower input current to the motor; and the providing of improved system efficiency.

Other features and advantages of the present application will be apparent from the following, more detailed description of the embodiments, taken in conjunction with the accompanying drawings which illustrate, by way of example, the principles of the application.

BRIEF DESCRIPTION OF THE DRAWINGS

Wherever possible, the same reference numbers will be used throughout the drawings to refer to the same or like parts.

DETAILED DESCRIPTION OF THE EMBODIMENTS

Figure 1:
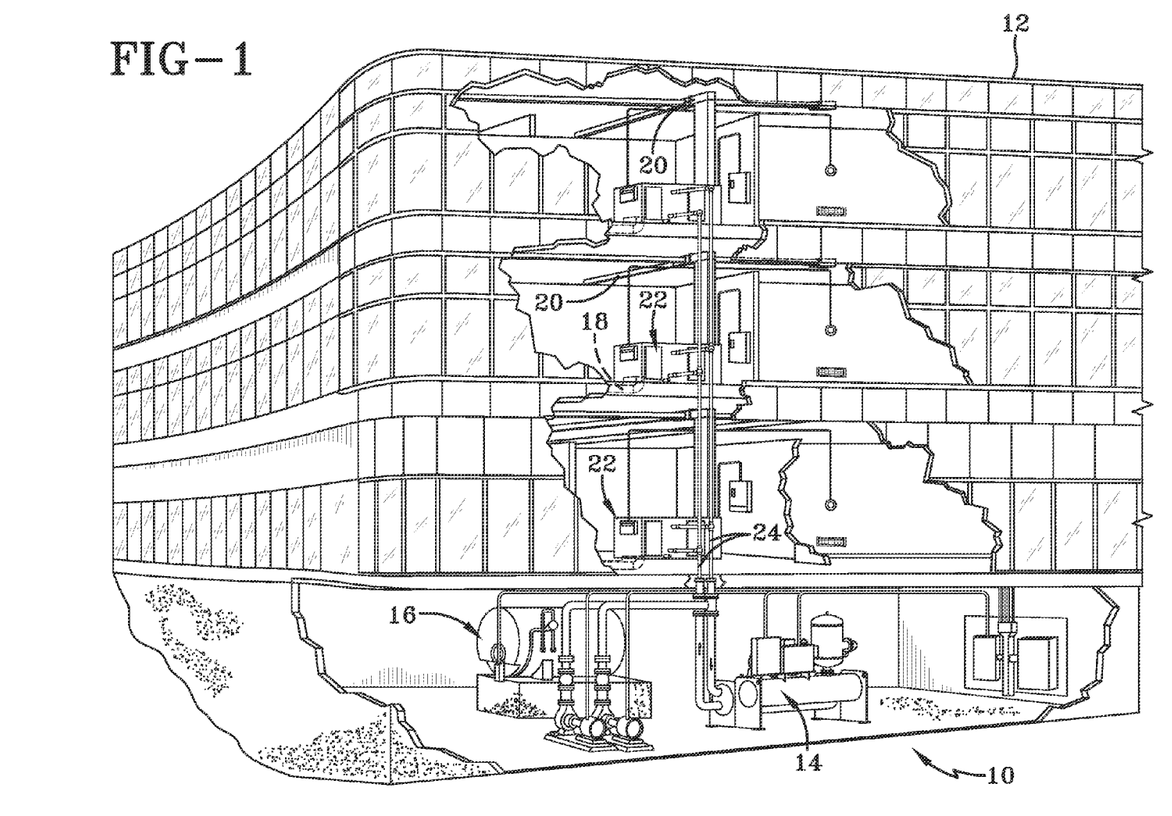
FIG. 1 shows an exemplary embodiment for a heating, ventilation and air conditioning system.

FIG. 1 shows an exemplary environment for a heating, ventilation and air conditioning (HVAC) system 10 in a building 12 for a typical commercial setting. The system 10 can include a vapor compression system 14 that can supply a chilled liquid which may be used to cool the building 12. The system 10 can include a boiler 16 to supply heated liquid that may be used to heat the building 12 and an air distribution system which circulates air through the building 12. The air distribution system can also include an air return duct 18, an air supply duct 20 and an air handler 22. The air handler 22 can include a heat exchanger that is connected to the boiler 16 and vapor compression system 14 by conduits 24. The heat exchanger in the air handler 22 may receive either heated liquid from the boiler 16 or chilled liquid from the vapor compression system 14, depending on the mode of operation of the system 10. The system 10 is shown with a separate air handler on each floor of the building 12, but it is appreciated that the components may be shared between or among floors.

Figure 2:
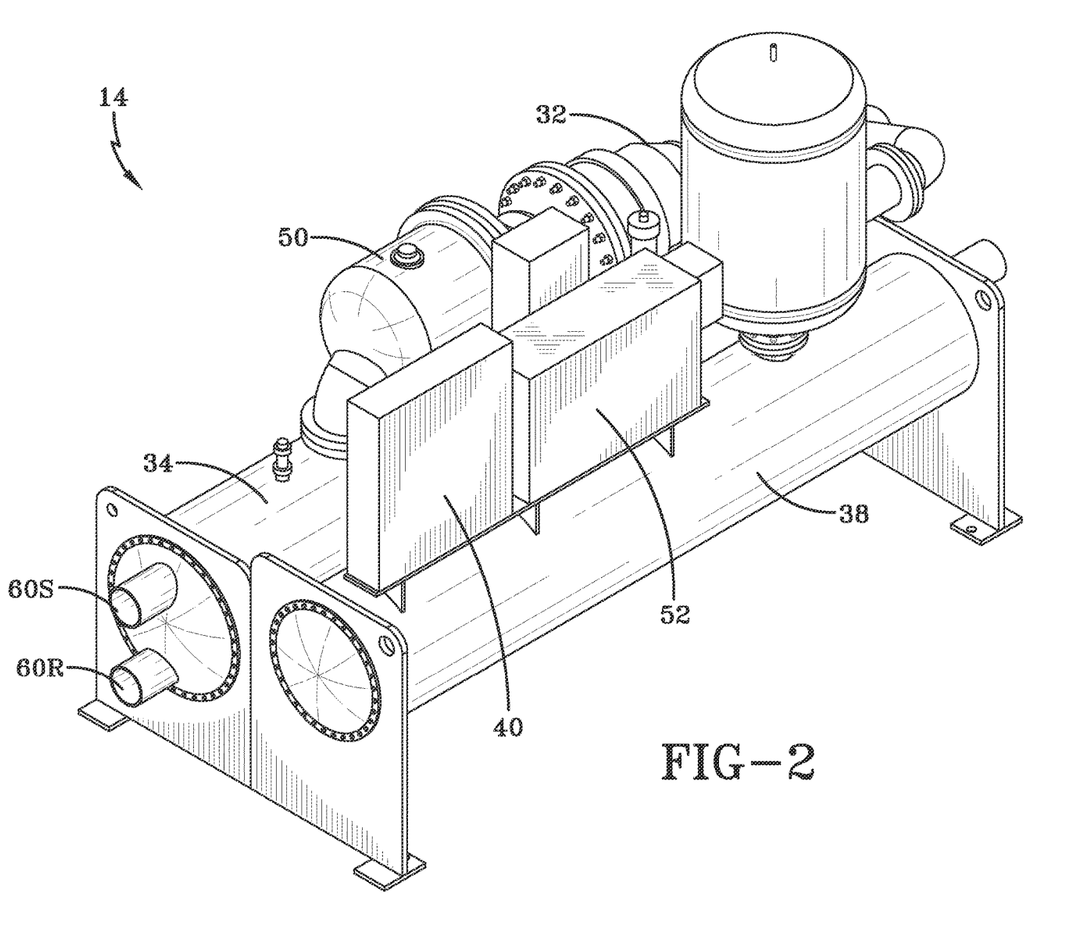
FIG. 2 shows an isometric view of an exemplary embodiment of a vapor compression system.
Figure 3:
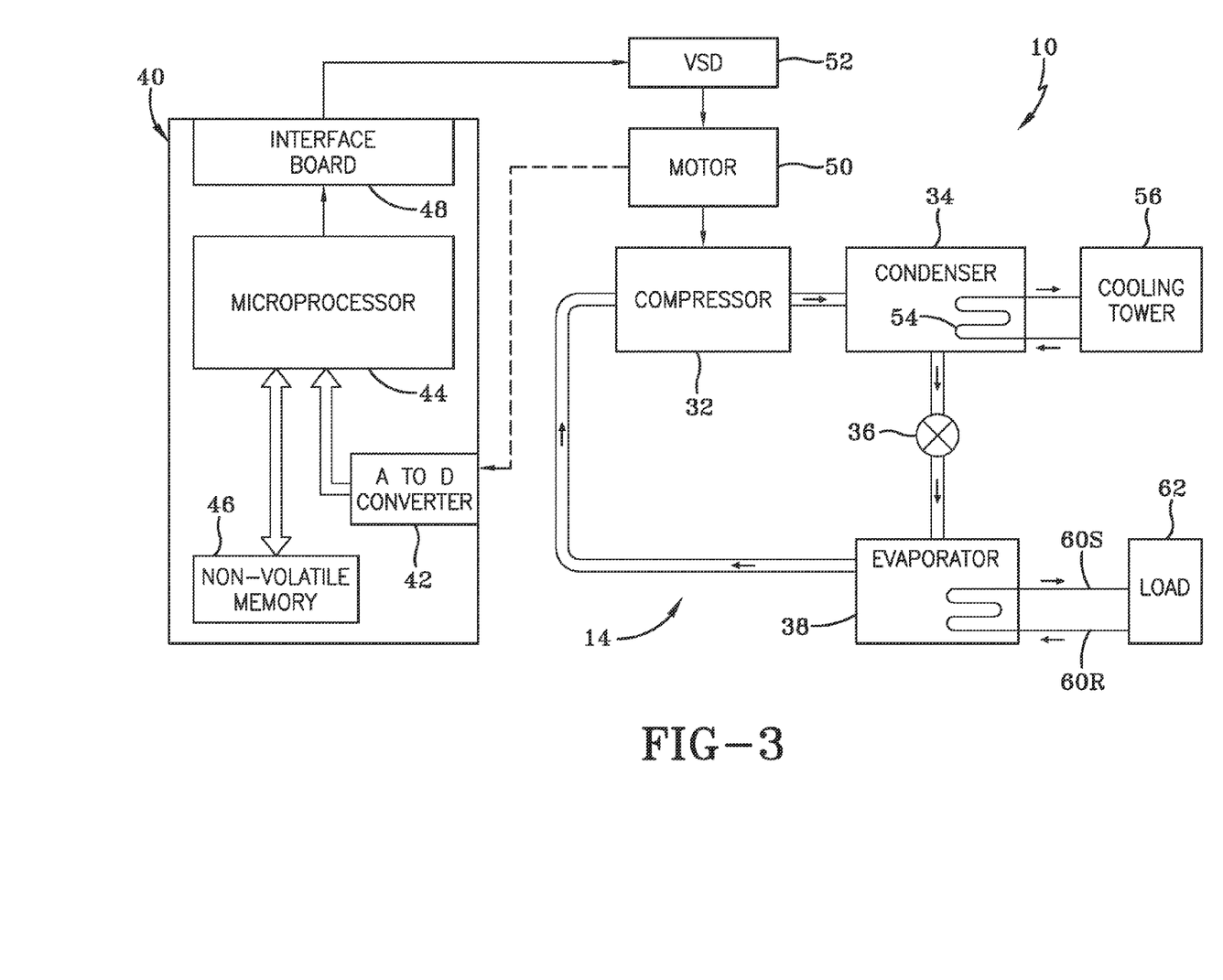
FIGS. 3 and 4 schematically show exemplary embodiments of a vapor compression system.

FIGS. 2 and 3 show an exemplary vapor compression system 14 that can be used in an HVAC system 10. The vapor compression system 14 can circulate a refrigerant through a circuit starting with a compressor 32 and including a condenser 34, expansion valve(s) or device(s) 36, and an evaporator or liquid chiller 38. The vapor compression system 14 can also include a control panel 40 that can include an analog to digital (A/D) converter 42, a microprocessor 44, a non-volatile memory 46, and an interface board 48. Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor or any other suitable type of refrigerant. In an exemplary embodiment, the vapor compression system 14 may use one or more of each of variable speed drive (VSD) 52, motor 50, compressor 32, condenser 34, expansion valve 36 and/or evaporator 38 in one or more refrigerant circuits.

The motor 50 used with the compressor 32 can be powered by a VSD 52. The VSD 52 receives AC power having a particular fixed line voltage and fixed line frequency from the AC power source and provides power having a variable voltage and frequency to the motor 50. The motor 50 can include any type of electric motor that can be powered by a VSD. The motor 50 can be any suitable motor type, for example, a switched reluctance motor, an induction motor, or an electronically commutated permanent magnet motor.

The compressor 32 compresses a refrigerant vapor and delivers the vapor to the condenser 34 through a discharge passage. The compressor 32 can be a screw compressor in one exemplary embodiment. However, the compressor 32 can be any suitable type of positive displacement compressor or a centrifugal compressor. The refrigerant vapor delivered by the compressor 32 to the condenser 34 transfers heat to a fluid, for example, water or air. The refrigerant vapor condenses to a refrigerant liquid in the condenser 34 as a result of the heat transfer with the fluid. The liquid refrigerant from the condenser 34 flows through the expansion device 36 to the evaporator 38. In the exemplary embodiment shown in FIG. 3, the condenser 34 is water cooled and includes a tube bundle 54 connected to a cooling tower 56.

The liquid refrigerant delivered to the evaporator 38 absorbs heat from another fluid, which may or may not be the same type of fluid used for the condenser 34, and undergoes a phase change to a refrigerant vapor. In the exemplary embodiment shown in FIG. 3, the evaporator 38 includes a tube bundle having a supply line 60S and a return line 60R connected to a cooling load 62. A process fluid, for example, water, ethylene glycol, calcium chloride brine, sodium chloride brine, or any other suitable liquid, enters the evaporator 38 via the return line 60R and exits the evaporator 38 via the supply line 60S. The evaporator 38 lowers the temperature of the process fluid in the tubes. The tube bundle in the evaporator 38 can include a plurality of tubes and a plurality of tube bundles. The vapor refrigerant exits the evaporator 38 and returns to the compressor 32 by a suction line to complete the cycle.

Figure 4:
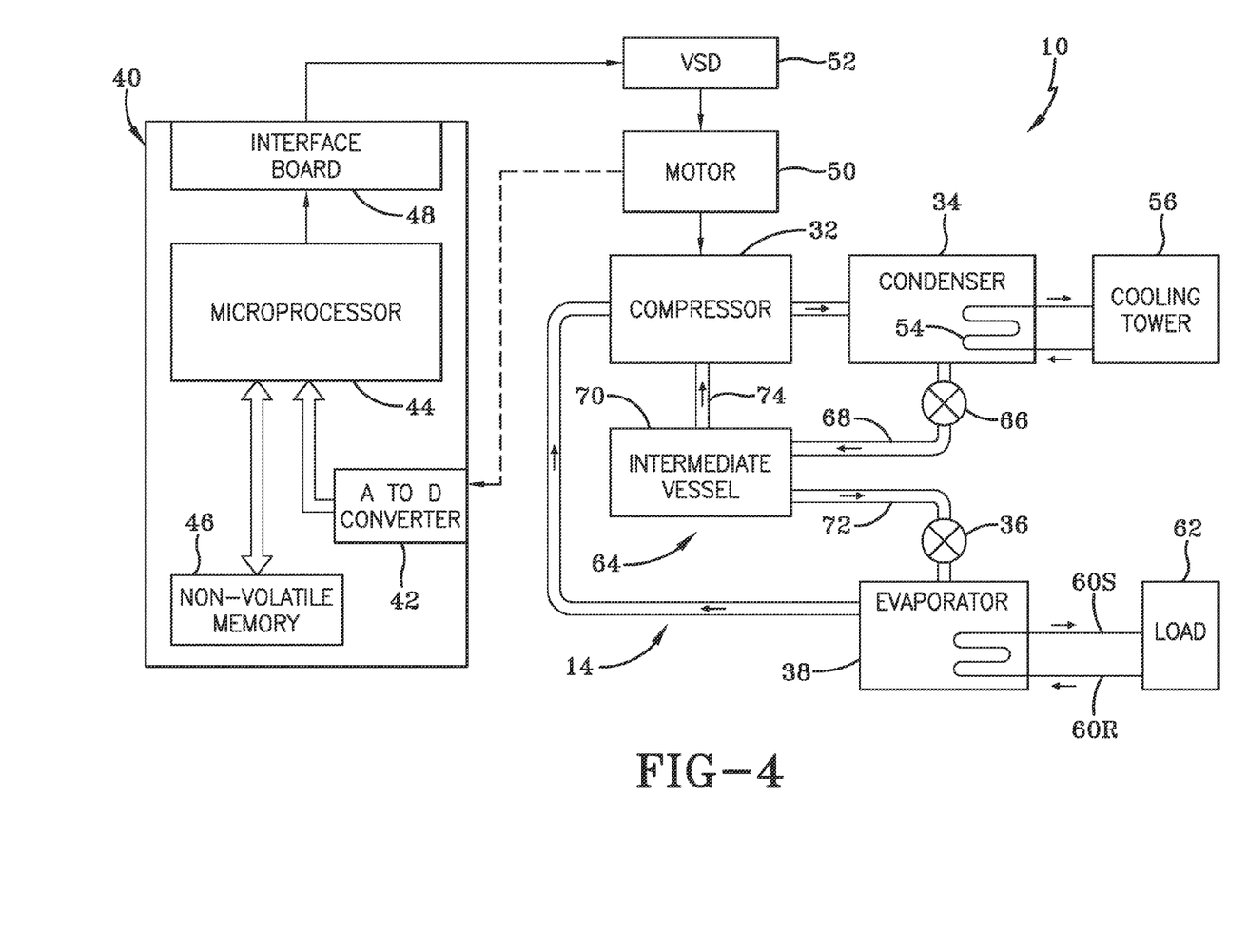

FIG. 4, which is similar to FIG. 3, shows the vapor compression system 14 with an intermediate circuit 64 incorporated between the condenser 34 and the expansion device 36. The intermediate circuit 64 has an inlet line 68 that can be either connected directly to or can be in fluid communication with the condenser 34. As shown, the inlet line 68 includes an expansion device 66 positioned upstream of an intermediate vessel 70. The intermediate vessel 70 can be a flash tank, also referred to as a flash intercooler, in an exemplary embodiment. In an alternate exemplary embodiment, the intermediate vessel 70 can be configured as a heat exchanger or a "surface economizer." In the configuration shown in FIG. 4, the intermediate vessel 70 is a flash tank and the expansion device 66 operates to lower the pressure of the liquid received from the condenser 34. During the expansion process, a portion of the liquid vaporizes. The intermediate vessel 70 may be used to separate the vapor from the liquid received from the expansion device 66 and may also permit further expansion of the liquid. The vapor may be drawn by the compressor 32 from the intermediate vessel 70 through a line 74 to the suction inlet, a port at a pressure intermediate between suction and discharge or an intermediate stage of compression. The liquid that collects in the intermediate vessel 70 is at a lower enthalpy from the expansion process. The liquid from the intermediate vessel 70 flows in a line 72 through a second expansion device 36 to the evaporator 38.

In an exemplary embodiment, a compressor 32 can include a compressor housing that contains the working parts of the compressor 32. Vapor from the evaporator 38 can be directed to an intake passage of the compressor 32. The compressor 32 compresses the vapor with a compression mechanism and delivers the compressed vapor to the condenser 34 through a discharge passage. The motor 50 may be connected to the compression mechanism of the compressor 32 by a drive shaft.

Vapor flows from the intake passage of a positive displacement compressor 32 and enters a compression pocket of the compression mechanism. The compression pocket is reduced in size by the operation of the compression mechanism to compress the vapor. The compressed vapor can be discharged into the discharge passage. For example, for a screw compressor, the compression pocket is defined between the surfaces of the rotors of the compressor. As the rotors of the compressor engage one another, the compression pockets between the rotors of the compressor, also referred to as lobes, are reduced in size and are axially displaced to a discharge side of the compressor.

Figure 5:
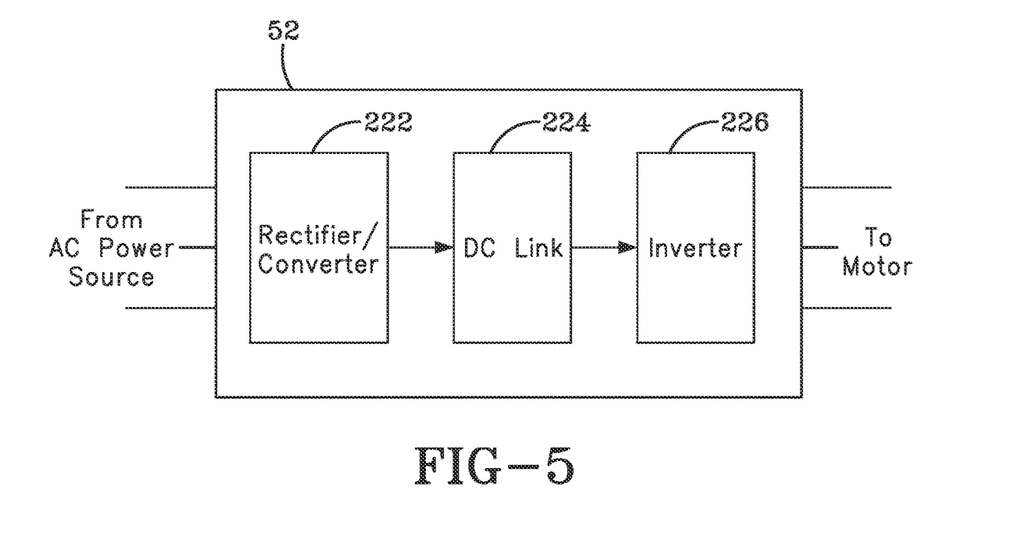
FIG. 5 schematically shows an exemplary embodiment of a variable speed drive.

FIG. 5 shows an exemplary embodiment of a VSD. The VSD 52 receives AC power having a particular fixed line voltage and fixed line frequency from an AC power source and provides AC power to a motor 50 at a desired voltage and desired frequency, both of which can be varied to satisfy particular requirements. The VSD 52 can have three components: a rectifier/converter 222, a DC link 224 and an inverter 226. The rectifier/converter 222 converts the fixed frequency, fixed magnitude AC voltage from the AC power source into DC voltage. The DC link 224 filters the DC power from the converter 222 and provides energy storage components such as capacitors and/or inductors. Finally, the inverter 226 converts the DC voltage from the DC link 224 into variable frequency, variable magnitude AC voltage for the motor 50.

In an exemplary embodiment, the rectifier/converter 222 may be a three-phase pulse width modulated boost rectifier having insulated gate bipolar transistors to provide a boosted DC voltage to the DC link 224 to obtain a maximum RMS output voltage from the VSD 52 greater than the input voltage to the VSD 52. Alternately, the converter 222 may be a passive diode or thyristor rectifier without voltage-boosting capability.

The VSD 52 can provide a variable magnitude output voltage and a variable frequency to the motor 50, to permit effective operation of the motor 50 in response to particular load conditions. The control panel 40 can provide control signals to the VSD 52 to operate the VSD 52 and the motor 50 at appropriate operational settings for the particular sensor readings received by the control panel 40. For example, the control panel 40 can provide control signals to the VSD 52 to adjust the output voltage and output frequency provided by the VSD 52 in response to changing conditions in the vapor compression system 14. In one exemplary embodiment, the control panel 40 can provide instructions to increase or decrease the output voltage and output frequency, while maintaining the same V/f ratio, provided by the VSD 52 in response to increasing or decreasing load conditions on the compressor 32. However, in another exemplary embodiment, the control panel 40 can individually increase or decrease the output voltage and/or the output frequency from the VSD 52 to obtain different V/f ratios from the VSD 52.

Figure 6:
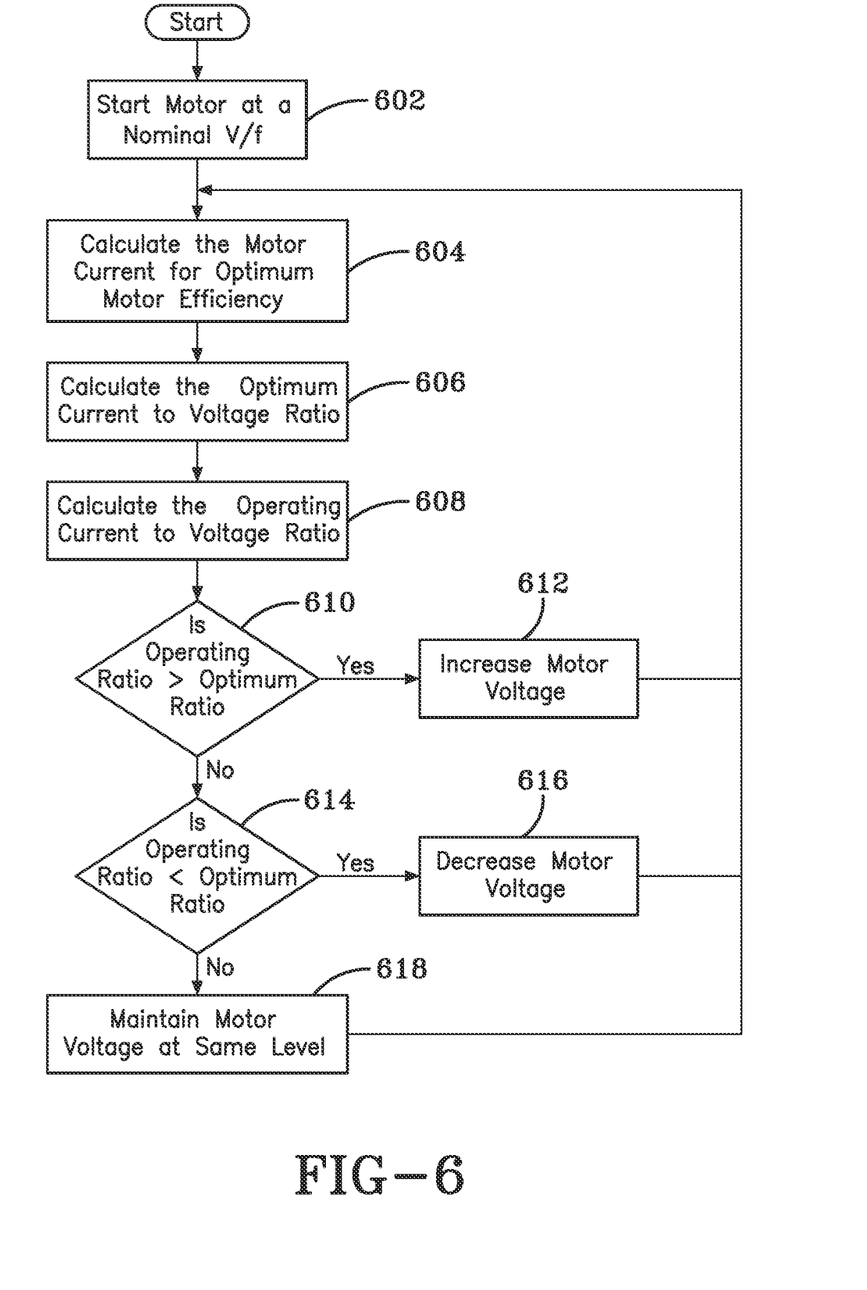
FIG. 6 shows an exemplary embodiment of a process for adjusting the voltage of a compressor motor.

FIG. 6 shows an exemplary embodiment of a process executed by the control panel for adjusting the voltage of a compressor motor. The process begins by starting a motor at a nominal or predetermined voltage/frequency (V/f) ratio (step 602). The motor current corresponding to the optimum motor efficiency (optimum motor current) for the motor at the predetermined V/f can then be calculated (step 604) as function of operating frequency (either measured or determined by the control panel) using a curve fit technique as shown in either of FIGS. 7 and 8. In other words, the optimum motor current is determined as a function of operating frequency resulting from a curve fit of measured current values at selected frequencies (as indicated by the points in FIGS. 7 and 8) when operating the motor at the predetermined V/f ratio. In another embodiment, instead of using the value calculated from the curve fit function, the optimum motor current can be calculated or assigned to be the corresponding measured value used to generate the curve (or function), if that data is available. In the embodiments shown in FIGS. 7 and 8, each curve corresponds to a predetermined motor type having a predetermined maximum voltage (e.g., 460 V) and operating at the predetermined V/f ratio (e.g., 2.3 V/Hz). In other embodiments, different charts and curves can be generated for different motor types, different maximum voltages and/or different V/f ratios. In the embodiments shown in FIGS. 7 and 8, a linear regression technique was used for the curve fit. However, in other embodiments, different curve fitting techniques can be used.

The corresponding optimum current to voltage ratio can be calculated (step 606) using the calculated optimum motor current and the operating voltage, i.e., the voltage based on the operating frequency and the predetermined V/f ratio. An operating current to voltage ratio can be calculated (step 608) based on the measured current and the operating voltage. A determination is made as to whether the operating current to voltage ratio is greater than the optimum current to voltage ratio (step 610). If the operating current to voltage ratio is greater than the optimum current to voltage ratio then the motor voltage is increased (step 612) in one or more increments or steps until the ratios are about the same (e.g., within 5%) or equal and the process returns to calculate the optimum motor current. If the operating current to voltage ratio is not greater than the optimum current to voltage ratio then a determination is made as to whether the operating current to voltage ratio is less than the optimum current to voltage ratio (step 614). If the operating current to voltage ratio is less than the optimum current to voltage ratio then the motor voltage is decreased (step 616) in one or more increments or steps until the ratios are about the same (e.g., within 5%) or equal and the process returns to calculate the optimum motor current. If the operating current to voltage ratio is not less than the optimum current to voltage ratio then the operating motor voltage is held or maintained at the same level (step 618). The process then returns to calculate the optimum motor current. In one embodiment, steps 604-618 are periodically repeated at a preselected times or intervals to maintain the motor voltage near the optimum value. In another embodiment, the motor voltage may be updated several times a second (e.g., in steps 612 or 616) since the motor should respond to any voltage changes within a few electrical cycles.

In one exemplary embodiment, sudden changes in motor speed or load may require an interrupt or override to the process that results in the use of the nominal V/F during the transient period and then, once the conditions are reasonably stable, the process resumes or restarts to adjust to the optimum voltage. In another exemplary embodiment, the increasing or decreasing of the motor voltage in step 612 and step 618 can be increased until a predetermined maximum voltage is reached or obtained and decreased until a predetermined minimum voltage level is obtained or reached.

Figure 9:
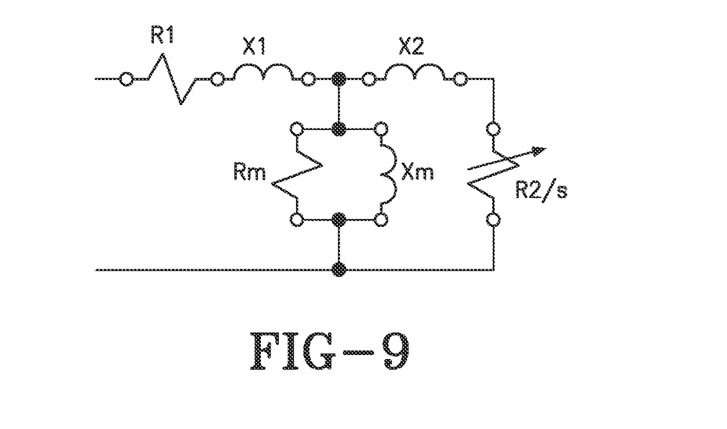
FIG. 9 shows an exemplary embodiment of an equivalent circuit for a motor.

FIG. 9 shows an exemplary embodiment of an equivalent circuit for a motor. The equivalent circuit in FIG. 9 can be used as a starting point to determine the output voltage for the motor (as supplied by the inverter of the variable speed drive). In FIG. 9, s=slip; R1=resistance; X1 and X2=reactances; R2=resistance corresponding to output power; Rm=stator winding resistance; and Xm=stator winding reactance. In other exemplary embodiments, different equivalent motor circuits can be used. Regardless of the equivalent motor circuit that is used, a common feature of the equivalent circuit is that motor efficiency is a function only of slip for a given frequency. For a given torque requirement, the optimum voltage is simply the one that gives the optimum slip. In addition, the equivalent circuit of FIG. 9 can indicate that torque is proportional to the square of current for a given value of slip. While the VSD logic board or control panel may not measure torque, the VSD logic board or control panel does measure motor current. The above relations directed to torque, the optimum voltage and optimum slip and torque, current and slip result in an optimum motor impedance (corresponding to the optimum current to voltage ratio) at the optimum slip condition. The optimum current to voltage ratio should be more or less independent of actual motor load so long as the equivalent circuit is reasonably valid.

Figure 10:
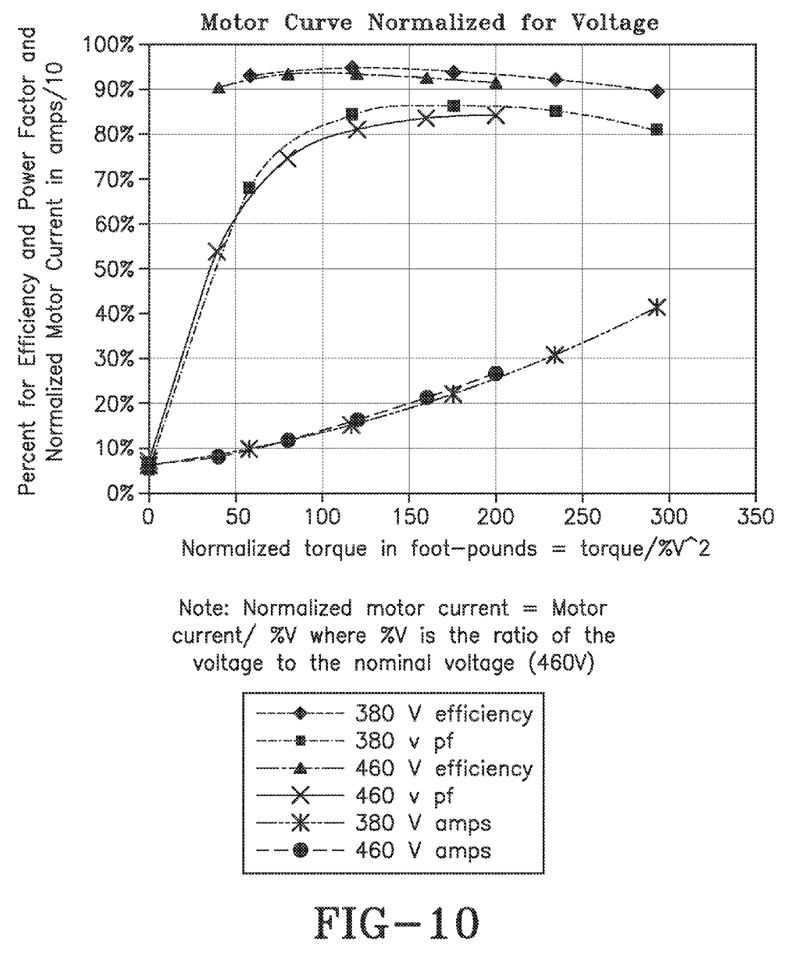
FIG. 10 shows an exemplary chart of motor current normalized for voltage.

FIG. 10 shows a motor curve normalized for voltage. Torque is divided by voltage squared (or the ratio of the optimum voltage to the nominal voltage squared) and the current is divided by voltage (or the ratio of the optimum voltage to the nominal voltage) to give the normalized values. FIG. 10 shows that the normalized motor current, efficiency, and power factor all line up or match very well for 380 V (an exemplary optimum voltage) and 460 V (an exemplary nominal voltage). In the embodiment shown in FIG. 10, the optimum efficiency at 460 V corresponds to a nominal torque of about 100 ft-lbs and normalized current of 140 amps. At 380 V, the optimum current would be 140 amps*(380 V/460 V)=116 amps and the corresponding torque would be 100 ft-lbs*(380 V/460 V)^2=68 ft-lbs.

Figure 7:
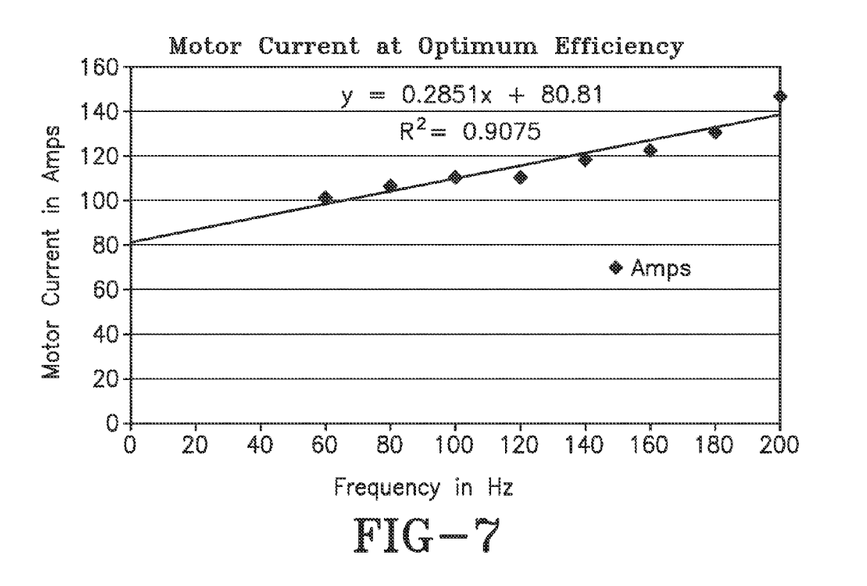
FIGS. 7 and 8 show exemplary charts of motor current at optimum motor efficiency.

The calculations can also work in reverse (or the opposite direction) to give the optimum voltage for a given torque condition. For example, if the required torque is 60 ft-lbs, the optimum voltage would still correspond to a normalized torque of 104 ft-lbs. The optimum voltage would be 460 V×sqrt(60 ft-lbs/100 ft-lbs)=356 V. If the motor were operating at this torque condition at 460 V, the motor current would be approximately 102 amps. The optimum normalized current is 140 amps, which corresponds to 140 amps*356V/460 V=108 amps at the reduced voltage. Using the control process of FIG. 6 with this embodiment, the process would start with the nominal V/f, which corresponds to 460 V. At 460 V, the motor current is about 102 amps, which gives a ratio of motor current to voltage of 0.221 amps/volt. The optimum motor current from the curve fit in FIG. 7 is 138 amps at the nominal V/f, which corresponds to motor current to voltage ratio of 138 amps/460 V=0.300 amps/volt. Since the operating amps/volt are less than the optimum, the control process should gradually reduce motor voltage to get to the optimum voltage condition.

Figure 11:
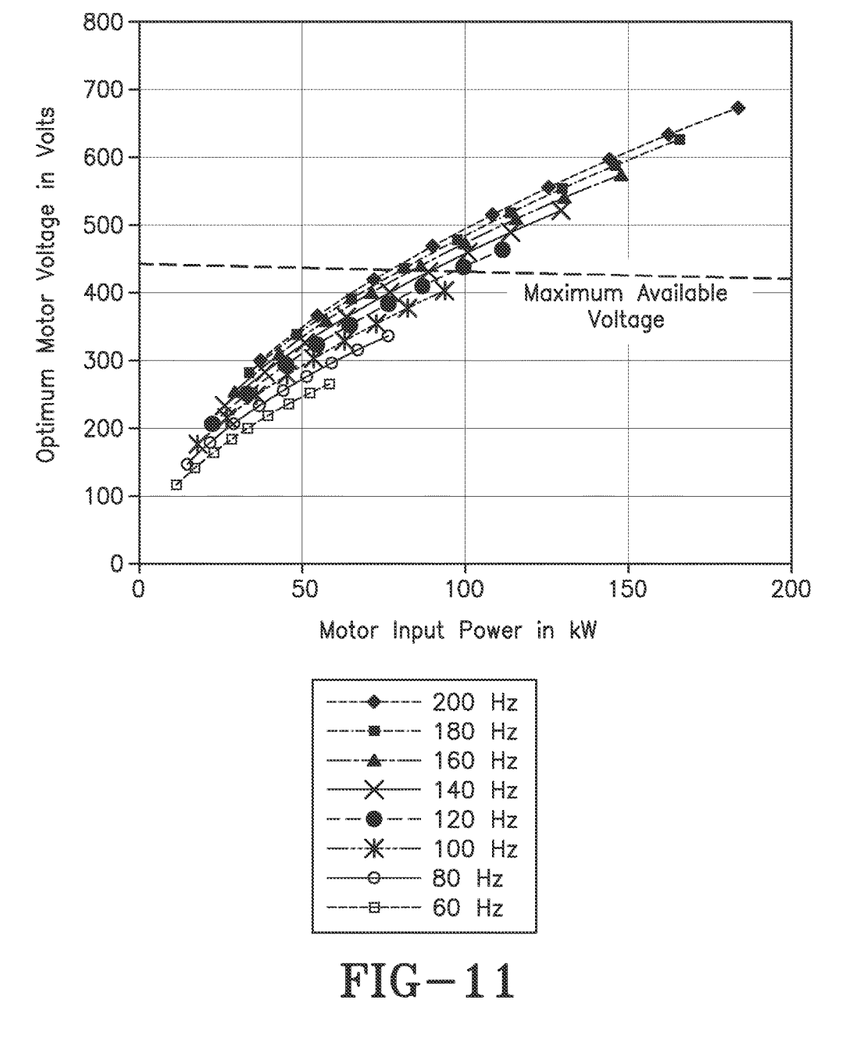
FIG. 11 shows an exemplary chart of optimum motor voltage versus input power and frequency.
Figure 12:
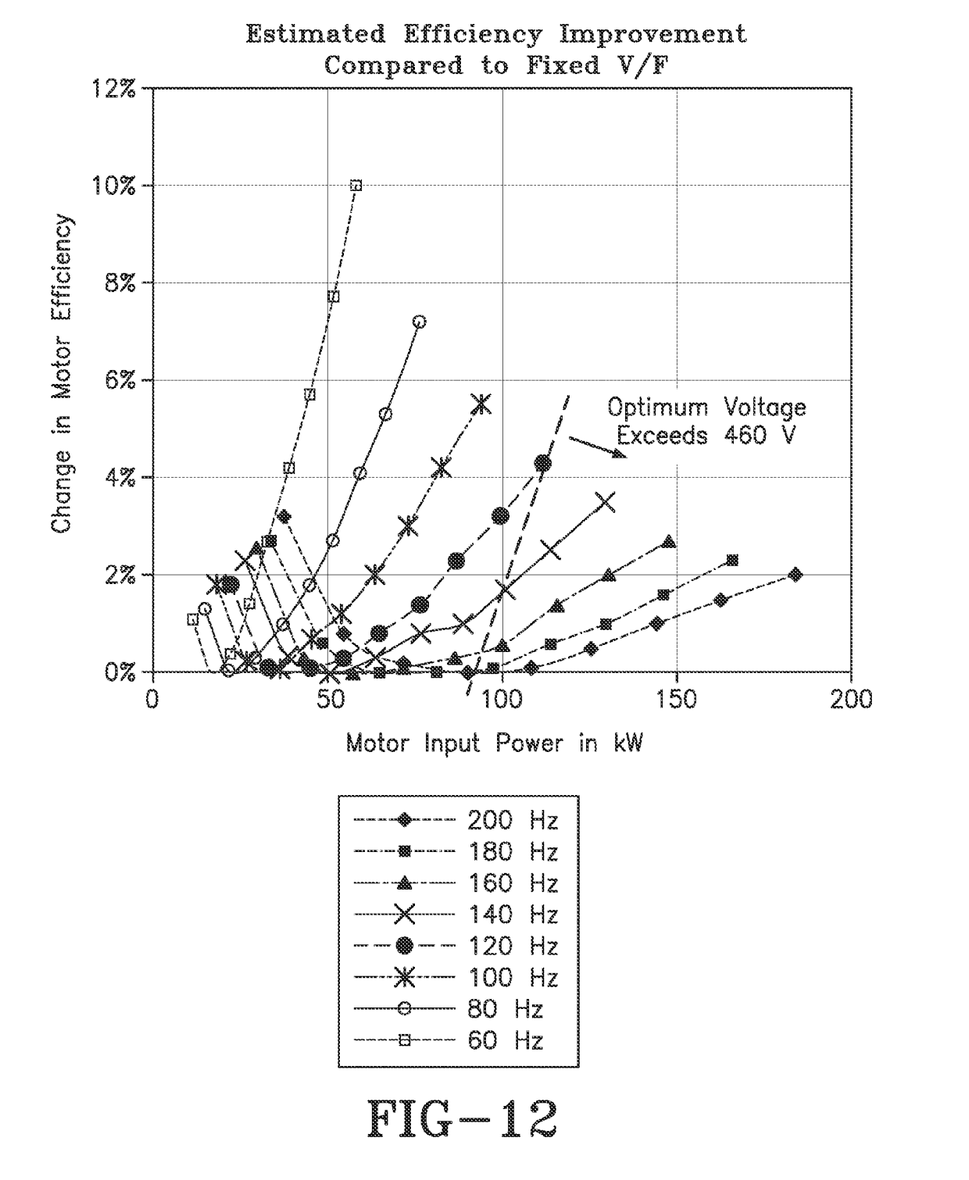
FIG. 12 shows an exemplary chart of estimated efficiency improvements compared to fixed V/f.

FIG. 11 shows the optimum input voltage versus input power and frequency for a 460 V motor such as the one from FIGS. 7 and 10. FIG. 12 shows the potential efficiency improvement based on the assumption that optimum voltage can give the peak motor efficiency found on the motor curve for that same frequency and a V/f of 2.3 V/Hz. FIG. 12 shows the largest improvements in motor efficiency are at the combination of high load and low speed. The conditions are where the motor temperatures are the highest, so the optimum voltage may expand the operating range without liquid injection cooling in addition to improving efficiency.

Based on the information in FIG. 11, the use of the optimized motor voltage can result in the supplied voltage to the motor staying at or below the maximum available voltage for frequencies up to ~120 Hz. The use of the optimized motor voltage can result in better system efficiency, lower motor temperatures, and lower input current to the motor, especially for air-cooled chillers in high ambient temperature environments and high-temperature heat pumps.

In another exemplary embodiment, the control process can be modified to use a V/f ratio instead of a current to volts ratio to determine the optimum voltage. The optimum V/f ratio can be calculated as $V/f_{new}=V/f_{nom}*sqrt(I_{measured}/I_{opt})$.

Figure 8:
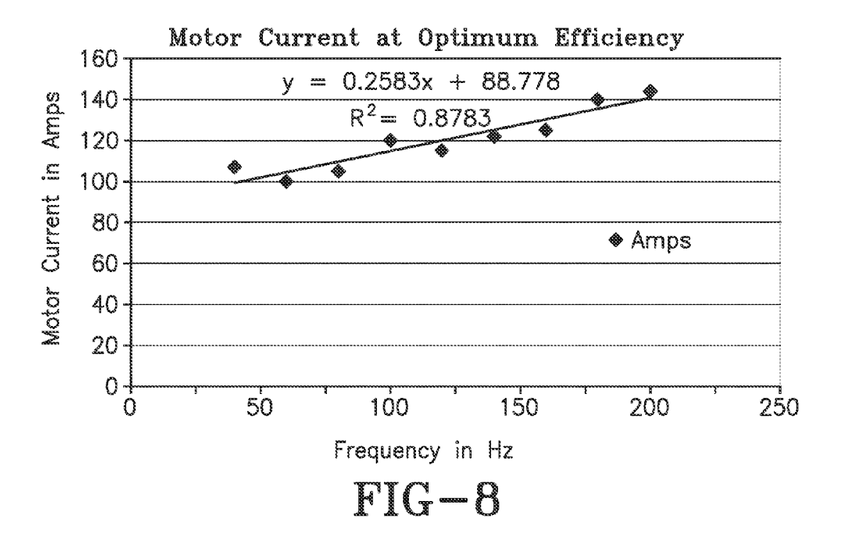

Referring back to FIG. 8, the data points used in FIG. 8 were determined with a motor having a nominal or design V/f of 2.3 V/Hz, which means that the motor requires 460 V when operated at 200 Hz. The data points in FIG. 8 are identified in Table 1.

TABLE 1

| Frequency | Motor Current at Optimum Efficiency |
|---|---|
| 200 | 144 |
| 180 | 140 |

TABLE 1-continued

| Frequency | Motor Current at Optimum Efficiency |
|---|---|
| 160 | 125 |
| 140 | 122 |
| 120 | 115 |
| 100 | 120 |
| 80 | 105 |
| 60 | 100 |
| 40 | 107 |

In one embodiment using the curve/function of FIG. 8, a inverter output frequency (or motor input frequency) of 200 Hz can result in a motor current of 116 amps. Using the curve/function of FIG. 8, the optimum current for 460 V and 200 Hz is 140.4 amps. The optimum voltage for the measured current is then 380 V.

A maximum voltage limit should also be included in the controls in many cases. The equivalent circuit does not consider the non-linear effects such as magnetic saturation. These effects can become important at high voltage to frequency ratios. For this reason, it can be desirable to limit the maximum output voltage. The limit can be a linear relation with motor input frequency, a maximum V/f ratio, table lookup, or other functional relation.

It is important to note that the construction and arrangement of the present application as shown in the various exemplary embodiments is illustrative only. Although only a few embodiments have been described in detail in this application, those who review this application will readily appreciate that many modifications are possible (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter described in the application. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims.

Furthermore, in an effort to provide a concise description of the exemplary embodiments, all features of an actual implementation may not have been described (i.e., those unrelated to the presently contemplated best mode of carrying out the invention, or those unrelated to enabling the invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system comprising:
  a compressor, a condenser, an expansion device and an evaporator connected in a closed refrigerant circuit;
  a motor connected to the compressor to power the compressor;
  a variable speed drive connected to the motor to power the motor, the variable speed drive being operable to provide a variable voltage to the motor and a variable frequency to the motor;
  a control panel to control operation of the variable speed drive and one or more components of the system; and
  a sensor to measure a current for the motor, the sensor communicating the measured motor current to the control panel;
  wherein the control panel is configured to execute a control algorithm with the measured motor current as an input to adjust a voltage provided to the motor by the variable speed drive in order to adjust an operating current/volts ratio after comparing the operating current/volts ratio to a stored current/volts ratio stored in a memory device.

2. The system of claim 1 wherein the control panel controls the variable speed drive to provide an output to the motor having a predetermined volts/frequency ratio.

3. The system of claim 2 wherein the stored current/volts ratio is calculated by the control panel using the control algorithm with the predetermined volts/frequency ratio and an operating frequency output by the variable speed drive as inputs.

4. The system of claim 3 wherein the control panel calculates the operating current/volts ratio using the control algorithm with the measured motor current, the predetermined volts/frequency ratio and the operating frequency output by the variable speed drive as inputs.

5. The system of claim 4 wherein the control panel increases the voltage output by the variable speed drive in response to the operating current/volts ratio being greater than the stored current/volts ratio.

6. The system of claim 4 wherein the control panel decreases the voltage output by the variable speed drive in response to the operating current/volts ratio being less than the stored current/volts ratio.

* * * * *